Aug. 3, 1948.   R. HASKINS, JR   2,446,180
GYROSCOPE CONTROLLING MEANS
Filed April 5, 1944   2 Sheets-Sheet 1
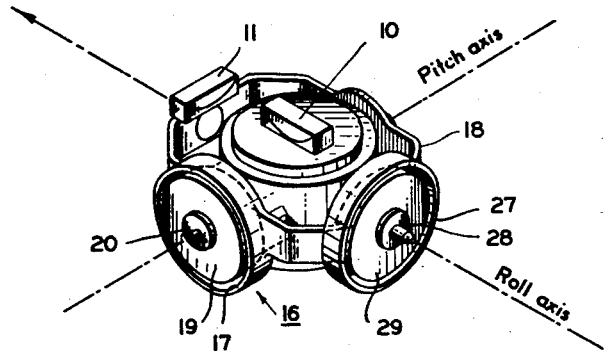
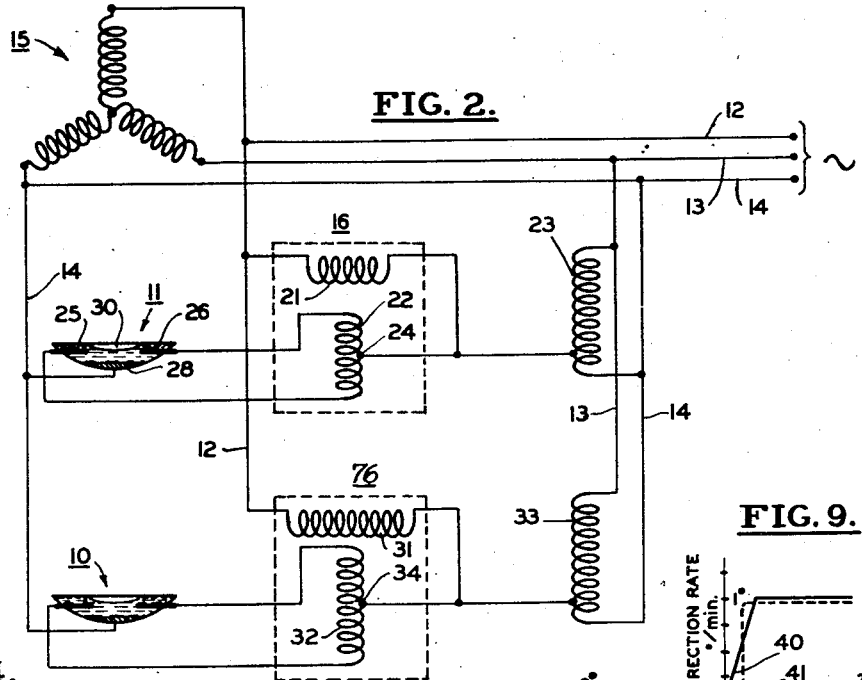
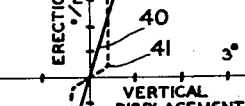
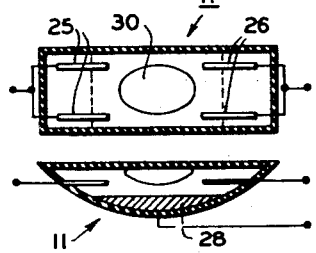
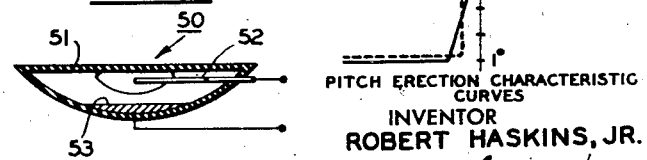
INVENTOR
ROBERT HASKINS, JR.
BY
Herbert H. Thompson
his ATTORNEY.

Aug. 3, 1948.   R. HASKINS, JR   2,446,180
GYROSCOPE CONTROLLING MEANS
Filed April 5, 1944   2 Sheets-Sheet 2
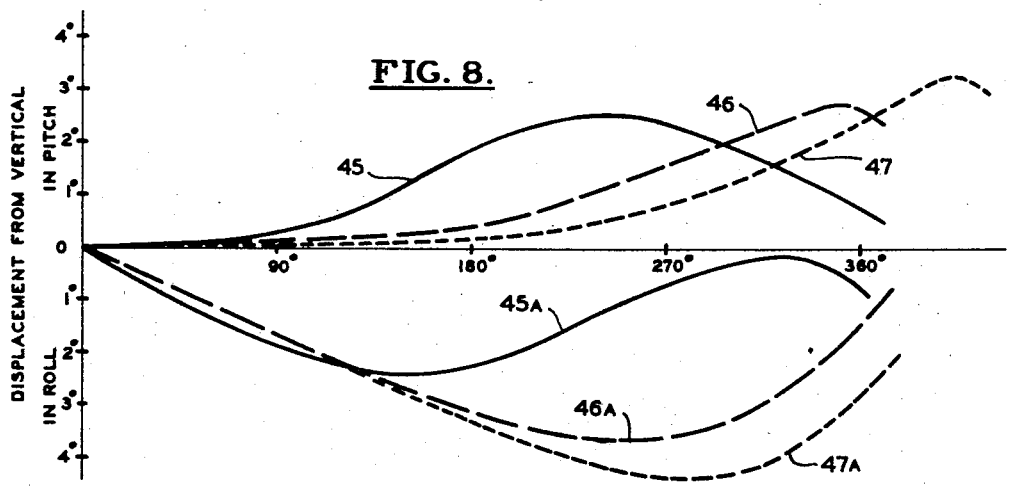
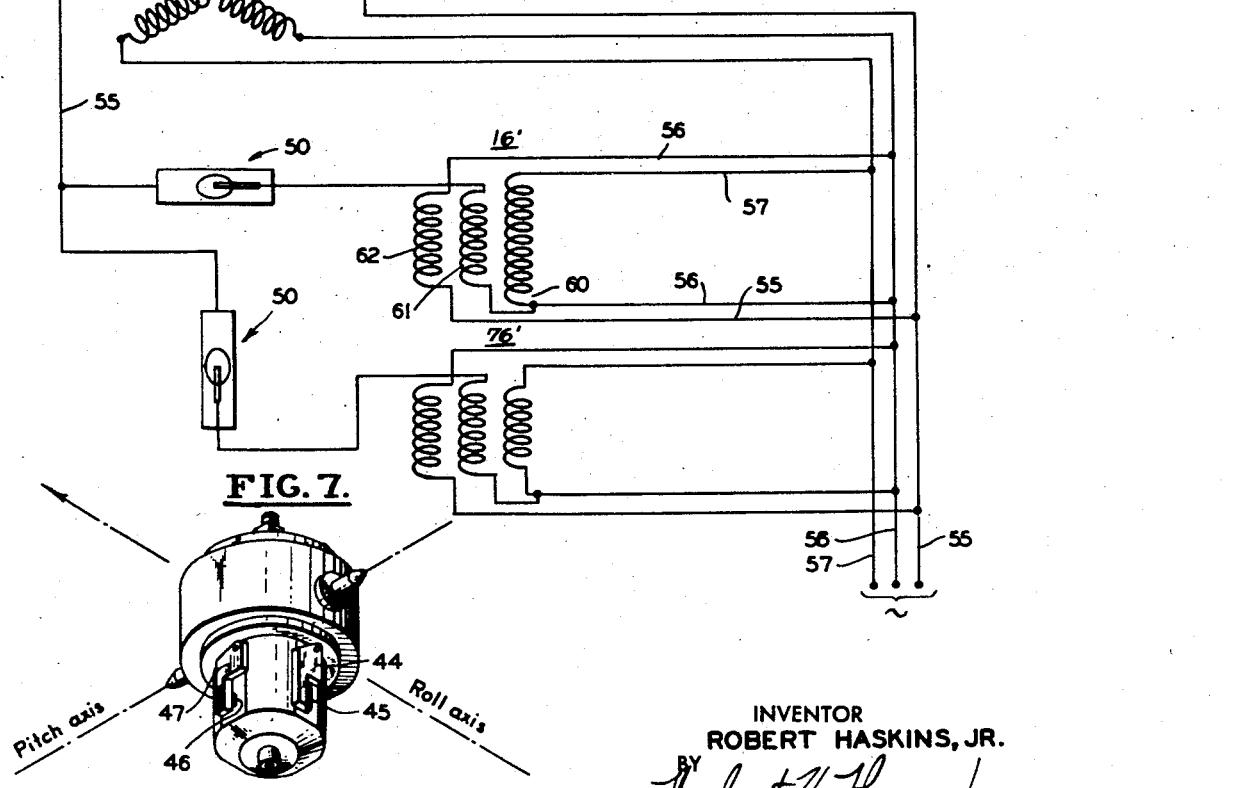
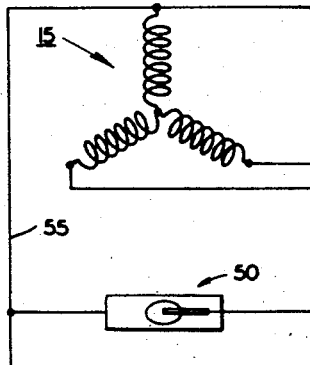
INVENTOR
ROBERT HASKINS, JR.
BY
*Herbert H. Thompson*
his ATTORNEY.

Patented Aug. 3, 1948

2,446,180

UNITED STATES PATENT OFFICE 2,446,180

GYROSCOPE CONTROLLING MEANS

Robert Haskins, Jr., Greensboro, N. C., assignor to The Sperry Corporation, a corporation of Delaware Application April 5, 1944, Serial No. 529,616

4 Claims. (Cl. 74—5)

This invention relates to gyro-verticals or gyroscopic artificial horizons for aircraft and has for one of its objects the provision of simplified means for reducing errors in such instruments during or due to turns of the craft on which they are mounted. Such instruments are widely employed on aircraft as attitude indicators for blind flying. The present instruments develop an error both in roll and pitch following turns of the craft, although normally maintained vertical by gravitationally responsive, power-controlled erecting devices, for example, pendulums or liquid level controllers, each of which controls a source of power acting about an axis normal to the tilt axis. Of the two errors, that in pitch is far more serious, both because it is the larger for the most common turn maneuver, i. e., a 180° turn, and because if followed, loss of altitude will result, as the pitch error is always down, which might lead to a crash.

When an airplane is turning, the gyroscope of such instruments becomes displaced due to horizontal acceleration or centrifugal forces acting on the roll-responsive gravitational devices, displacing them from a vertical position causing thereby a corresponding error in the position of the gyroscope which appears in the initial part of the turn on the instrument dial as a roll error. As the turn progresses, due to the shifting viewpoint of the pilot with respect to the gyroscope's now offset position in space, the error appears on the instrument as an error in pitch which accumulates more rapidly than the conventional erecting system can correct for. It should be understood that during a turn, neglecting the effect of fore-and-aft accelerations of the airplane (i. e. speeding up or slowing down) there are no accelerations acting on the pitch-responsive erecting devices other than gravity so therefore the pitch erecting system acts normally throughout the turn.

While this error is detected by the pitch-responsive erection devices in such a manner that a control torque is applied which would normally correct the tilt in pitch, it has been found that this pitch correction torque will maintain the pitch error at a low value only during the first part of the turn, and as the turn progresses, pitch error develops at a rate too fast to be corrected. The resulting error curve is but little better than when the pitch-erecting torque is effectively zero.

By means of the present invention, as the pitch error increases, a progressively increasing erection torque is exerted which maintains the pitch error at a low value throughout a turn of as much as 180°. While my invention does not cure and, in fact, may increase slightly the roll error during a turn, its great reduction of the pitch error more than compensates for the former apparent drawback, since an error in roll does not cause loss of altitude, as does an error in pitch, and hence is not dangerous to the proper flight of the craft.

A further feature of the invention is the improvement of liquid level controllers for gyro-verticals whereby greater sensitivity is secured and the number of lead-in wires is reduced.

The invention will now be described as applied to two different kinds of gravity-sensitive arrangements for positioning a vertical gyroscope.

Referring to the drawings:

Fig. 1 is a schematic drawing of gyroscope having electrically operated precessing motors;

Fig. 2 is a diagram of a gyroscope control circuit;

Fig. 3 is a similar diagram of a modified form of gyroscopic control circuit;

Figs. 4 and 5 show a liquid level switch in plan and elevation respectively, adapted for use in the circuit of Fig. 2;

Fig. 6 is a sectional view of another form of level switch, adapted for use in the circuit of Fig. 3;

Fig. 7 shows my invention as applied to an air-driven gyroscope, the gyroscope being shown independently of its mounting and in perspective;

Figs. 8 and 9 are curves illustrating the operation of a gyroscope during various conditions.

A system for controlling a gyroscope is shown in Figs. 1, 2, and 3 in which separate liquid level switches 10 and 11 are mounted respectively across the roll and pitch axes of a vertical gyroscope. Each switch is normally partially filled with conducting liquid or electrolyte, leaving a bubble 30, which is of course a relative non-conductor. At the bottom, an electrode 28 is provided to maintain contact with the liquid and near the top, opposite electrodes 25 and 26 are shown which lie near the bubble, so that upon tilt of the level, the electrode will project partially into the bubble and hence the resistance path of the current flowing between the electrodes 28 and 25 or 26 will be increased proportionately to the amount the respective electrode projects into the bubble. By separating each electrode into a pair of laterally spaced electrodes, greater accuracy is secured in case the gyroscope in inclined about both axes, as is generally the case. Each of these switches controls a torque motor for maintaining the gyroscope in vertical position, or in a position displaced at a predetermined angle from true vertical position.

In Fig. 2 three leads, 12, 13 and 14 from a source of three phase potential, not shown, are connected to the phase windings of stator 15 which spins the rotor of the gyroscope.

The torque motor 16 for correcting errors due to the displacement of the gyroscope about its roll axis has its stator 17 secured to gimbal frame 18 and its rotor 19 attached to shaft 20 integral with the gyroscope casing, as shown in Fig. 1.

Torque motor 16 has two sets of windings consisting of a fixed field 21 and a control winding 22, the former being constantly energized from a tap on transformer 23 connected across power leads 13 and 14; and by a connection to power lead 12.

Control winding 22 is energized from a center tap 24 connected to transformer 23, the outer terminals of the control winding being connected to contacts 25 and 26 of liquid level switch 11, Figs. 2, 4 and 5, having a common contact element 28 connected to power lead 14. The respective half windings of the control field are differentially disposed so that when both are equally energized, the field of one will neutralize that of the other. In other words, two equal and opposed rotating fields are produced, so long as the current flowing through the respective windings are equal. The liquid level switches are filled with an electrolyte, and the bubble 30 moves toward one end or the other with the displacement of the switch from level position, in the same manner as in conventional levels. If the level 11 is displaced by the rocking of its support about the roll axis, one or the other of contacts 25 or 26 will be uncovered to a greater or less extent, and the current flowing through the corresponding half winding of control field 24 will be reduced proportionately, with the result that a precession torque will be exerted by the opposite half of the winding which turns the gyroscope back to its vertical position, in which the rotary fields of both halves of the winding neutralize each other.

A similar torque motor 76 is shown for correcting the displacement of the gyroscope about its pitch axis which consists of a rotor 27 supported by means (not shown) and a stator 29 cooperating therewith secured to frame 18 about pivot 28 for the roll axis. The stator includes fixed field 31 constantly energized from power leads 13 and 14 and control field 32 energized from a tap on auto transformer 33 connected to center tap 34. The outer terminals of the coils are connected through liquid level switch 10 mounted along the roll axis to power lead 14. The operation of the torque motor just described is similar to that of motor 16.

Under normal conditions, the erection system as described is capable of maintaining the gyroscope in vertical position. As the airplane turns, the liquid in the roll-correcting-level switch 11 becomes displaced due to horizontal acceleration so that the switch no longer indicates a true level position. The bubble in the level switch moves from its center position and surrounds the contacts of the level switch at one end or the other causing an unbalance in the appropriate control field, causing a torque to be exerted which causes the gyroscope to be turned from its true position giving an error in roll which, as described above, becomes an error in pitch as the turn progresses. The latter is dangerous, because if the instrument were closely followed a crash may possibly result due to the erroneous indication.

By means of the present invention, the pitch error is kept at a low value throughout a turn of 180° which is sufficient for ordinary purposes. This is accomplished by increasing the effective torque of the pitch erector motor with respect to that of the roll erector motor. Preferably the torque of the pitch erection motor is increased progressively as the pitch error is increased until a predetermined torque rate has been reached. The optimum maximum pitch torque erection rate has been found to be substantially double that of the roll torque erection rate.

A gravity-responsive level switch of novel design for the purpose of progressively increasing the torque of the erection motors as the tilt angle of the switch is increased is shown respectively in plan and vertical section in Figs. 4 and 5.

As the level switch is tilted the contacts at the elevated end of the switch are progressively uncovered causing a change in the current flowing through the respective halves of the differentially wound control field resulting in a torque increasing with the angle of tilt until a predetermined maximum torque is reached. A torque curve of this kind is indicated by reference character 40 of Fig. 9 in comparison with a dotted curve 41 of known pendulum-controlled contact devices in which a torque of fixed value is applied immediately on the pendulum sensing a departure from level position which may be increased to a greater fixed rate at some further angular position. In Fig. 2, for the purpose of illustration, the pitch torque motor controlled by level switch 10 is shown as having a greater number of effective ampere turns to show that the pitch erection rate is greater than the roll erection rate.

Similarly in Fig. 7, showing an air-driven gyroscope, each pitch erector pendulum 44 is shown as cooperating with an opening 45 approximately double the size of the opening 46 each roll erector pendulum 47, whereby the torque exerted upon fore and aft tilt of the gyroscope (pitch) is greater than the torque exerted upon lateral tilt (roll).

In Fig. 8 a series of curves is shown in connection with a horizontal axis representing degrees of turn and a vertical axis laid out above the horizontal axis in degrees of pitch error and below the axis in degrees of roll error. The curves are drawn for erection devices having the erection rate-displacement function as shown by the heavy line curve 40 of Fig. 9, the full torque rate being attained at about 1° displacement from the vertical.

The curves 45 and 45A show the pitch and roll error respectively for a turn of 360° when a conventional erector system is used in which the respective torque motors have a rate of 4° per minute. It will be noted that at 90° the pitch error is small but rises rapidly until well beyond 180°.

Curves 46 and 46A indicate the error which arises in a system according to the present invention. In this case the roll erection rate is 4° per minute while the pitch erection is 8° per minute. Here it will be noted that the error in pitch at 180° is not much greater than at 90° and considerably less than shown by curve 45.

Curves 47 and 47A are typical where the pitch rate is increased beyond the ratio for curves 46 and 46A, for example, 4° per minute roll erection rate and 12° per minute pitch erection rate. Here it will be noted that the pitch error is somewhat lower than in the previous instance at 180°, but this slight advantage is offset by an undesirably increased error in roll.

It has been found that the absolute value of the two erection rates can be varied at will according to known gyroscope practice. The 2:1 ratio of the pitch and roll erection rates appears to be the most desirable because the pitch error is kept low during a turn of 180° without too great an increase in roll error.

A modification of the erector system of Fig. 2 is shown in Fig. 3. The latter permits some simplification of the gyroscope wiring in that but two leads are required for the level switches instead of the usual four leads which is made possible by a level switch of novel construction. The level switch indicated by reference character 50 is shown in plan in Fig. 3 and in elevation in Fig. 6. Referring to Fig. 6, the level switch comprises a tube 51 having an electrode 52 mounted near the upper surface at one end of the tube and extending about halfway along the tube so that a section of the electrode projects about halfway into the bubble when the switch is level. A second electrode 53 is provided to maintain contact with the electrolyte.

The system of Fig. 3 operates substantially the same as that shown in Fig. 2 except that one part 60 of the differential winding of the control field of the respective erection motors is constantly energized over leads 56 and 57 of a source of polyphase current while the other part 61 of the winding is normally energized equally and in opposite direction from lead 55 from the source of current via a level switch 50 which in its level position balances the voltage in the winding connected thereto so that no torque is exerted between the control field 60—61 and a fixed field 62.

If, for instance, the switch in Fig. 6 is tilted clockwise, the movement of the bubble causes an increased amount of electrode 52 to extend into the bubble, thereby increasing the resistance offered by the electrolyte and effecting a corresponding decrease in the current flowing in the winding 61, whereby the constantly energized winding 62 will prevail, thus causing a torque to be exerted by the motor in a direction to restore the gyroscope to the vertical position. Opposite tilt of the level would correspondingly increase the current in winding 61 above that in 62 with the opposite effect on the gyroscope. As in Fig. 2, the control field winding for the pitch erector torque motor 76' is shown with a greater number of turns than the roll erection motor 16' to indicate that a proportionately greater torque is exerted thereby.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a vertical gyroscope control system wherein a gyroscope is maintained in vertical position by erection torque devices controlled by individual gravity responsive members disposed along quadrantal axes of the gyroscope, means for maintaining pitch error at a low value during a tuning movement of a craft supporting the gyroscope which comprises a power erection arrangement including a torque device for correcting error in pitch and a device for correcting error in roll, the device for correcting error in pitch having a greater torque gradient than the other device.

2. A vertical gyroscope of the air driven type having a casing provided with air ports and cooperating pendulums located along both the roll and pitch axes for the purpose of providing an erection torque about the respective axes to maintain the gyroscope in vertical position, the air ports aligned with the pitch axis being substantially greater in area and hence capable of producing greater relative torque than those located along the roll axis for the purpose of maintaining pitch error at a low value when the supporting craft makes a turn.

3. In an instrument having a gyroscope and electrically actuated means for erecting the gyroscope, the combination of a liquid level controller comprising a tube or the like partially filled with a conducting liquid, leaving a bubble, and mounted transversely to one tilt axis, a lower electrode making continuous contact with said liquid, two groups of upper electrodes adjacent opposite ends of said tube, each group comprising a plurality of electrodes displaced along said tilt axis, and a torque-applying device so constructed and connected to said electrodes that the normal tendency of said device to exert torques in opposite directions on said gyroscope is normally balanced when the tube is level, but increases in one direction or the other upon increasing tilts of the level in one direction or the other about said axis.

4. In a gyro vertical for craft, torque exerting means for erecting the gyroscope upon fore and aft tilt thereof on the craft, and torque exerting means for erecting the gyroscope upon lateral tilt thereof, the former means being so constructed and arranged as to exert a relatively stronger torque than the latter means for like tilts, whereby the pitch error due to turning movement of the craft supporting the gyroscope is reduced.

ROBERT HASKINS, Jr.

REFERENCES CITED

The following references are of record in the file of this patent:

UNITED STATES PATENTS

| Number | Name | Date |
| --- | --- | --- |
| 1,982,636 | Carlson | Dec. 4, 1934 |
| 2,242,806 | Wunsch | May 20, 1941 |
| 2,366,543 | Meredith | Jan. 2, 1945 |
| 2,367,465 | Kunzer | Jan. 16, 1945 |
| 2,384,838 | Kellogg, 2nd | Sept. 18, 1945 |
| 2,390,532 | Haskins, Jr. et al. | Dec. 11, 1945 |